United States Patent [19]
Yokoyama et al.
[11] Patent Number: 4,943,812
[45] Date of Patent: Jul. 24, 1990

[54] THERMAL TRANSFER TYPE COLOR RECORDING METHOD AND APPARATUS THEREFOR

[75] Inventors: Takayuki Yokoyama; Yasuhiro Kyoden, both of Osaka, Japan
[73] Assignee: Minolta Camera Kabushiki Kaisha, Osaka, Japan

[21] Appl. No.: 267,536
[22] Filed: Nov. 4, 1988

[30] Foreign Application Priority Data

Nov. 7, 1987 [JP] Japan ..................... 62-280308
Nov. 7, 1987 [JP] Japan ..................... 62-280309

[51] Int. Cl.$^5$ ............ G01D 9/00; G01D 15/10; G01D 15/04
[52] U.S. Cl. ............ 346/1.1; 346/76 PH; 346/105
[58] Field of Search ............ 346/1.1, 76 PH, 105

[56] References Cited

U.S. PATENT DOCUMENTS 4,505,603 3/1985 Yana .................... 400/120
4,551,729 11/1985 Kubo et al. .............. 346/1.1
4,642,656 2/1987 Shibuya et al. ........... 346/76 PH

FOREIGN PATENT DOCUMENTS 0083687 5/1984 Japan .
0219158 12/1986 Japan .

*Primary Examiner*—George H. Miller, Jr.
*Assistant Examiner*—Huan Tran
*Attorney, Agent, or Firm*—Willian Brinks Olds Hofer Gilson & Lione

[57] ABSTRACT

A thermal transfer color recording method of and an apparatus for recording a color image on a transfer paper by successively transferring inks of different colors from an ink film to the transfer paper at a recording station. A ink of one color is transferred from the ink film to the transfer paper by a thermal head based on an image to be recorded while the ink film and the transfer paper are moved through the recording station in a forward direction in intimate contact with each other. After the transfer of the ink of one color, the transfer paper in intimate contact with the ink film is transported in the forward direction with the ink film not taken up to thereby slacken the ink film. Then, the transfer paper is transported in the reverse direction to position the leading end of the recorded area of the transfer paper at the recording station to transfer an ink of another color from the ink film to the transfer paper from the leading end of the recorded area thereof. Further, the ink film may be moved to position the ink of another color at the recording station after transport of the transfer paper to position a non-recorded area of the transfer paper at the recording station.

12 Claims, 8 Drawing Sheets

THERMAL TRANSFER TYPE COLOR RECORDING METHOD AND APPARATUS THEREFOR

FIELD OF THE INVENTION

The present invention relates to a thermal transfer color recording method and an apparatus therefore, and more particularly to a method of and an apparatus for recording color images on transfer paper with use of a single thermal head by successively transferring inks of different colors from an ink film to the paper.

BACKGROUND OF THE INVENTION

The thermal transfer color recording method mentioned above is disclosed in U.S. Pat. No. 4,505,603 (corresponding to Unexamined Japanese Patent Publication SHO 58-140270) and U.S. Pat. No. 4,642,656 (corresponding to Unexamined Japanese Patent Publication SHO 61-14973).

The disclosed method employs an ink film having ink layers arranged in succession and different from one another in color (e.g. yellow, magenta and cyan). For recording, the ink film and transfer paper in intimate contact therewith are transported in one direction relative to a thermal head. After an image has been recorded in one color, the ink film is transported in the same direction as for recording to position the next ink layer of another color in opposed relation to the thermal head, while the transfer paper having the ink of the first color transferred thereto is transported in a direction opposite to the direction for recording to position the leading end of the recording area thereof again in opposed relation to the thermal head.

When thus transported in directions opposite to each other, the transfer paper bearing the recorded image and the ink film are held in intimate contact with each other, so that the prior-art technique has the problem that the drive means are subjected to greatly varying loads due to the frictional resistance between the paper and the film. Consequently, the paper or the ink film becomes transported improperly to position the image of the second color out of register with the image of the first color. It is also likely that the transferred ink will be removed from the paper by friction.

SUMMARY OF THE INVENTION

Accordingly, the main object of the present invention is to provide a thermal transfer color recording method for producing satisfactory color images and an apparatus for practicing this method.

Another object of the invention is to provide a thermal transfer color recording method and an apparatus therefore wherein after recording with an ink of a color has been completed, the transfer paper and the ink film can be transported in different directions without producing great frictional resistance therebetween.

These objects are fulfilled by a thermal transfer color recording method with use of an ink film and transfer paper comprising transporting the transfer paper in the same direction as for recording, with ink film not taken up, after recording with an ink of a color has been completed, to thereby slacken the ink film, and, thereafter, transporting the transfer paper in a direction opposite to the direction for recording. The objects are fulfilled also by an apparatus for practicing this method.

In another aspect of the present invention, the ink film is transported while opposed to a non-recorded area of the transfer paper other than the recorded area thereof after recording has been completed with an ink of the color.

BRIEF DESCRIPTION OF THE DRAWINGS

These and other objects or features of the present invention will become apparent from the following description of a preferred embodiment thereof taken in conjunction with the accompanying drawings, in which.

In the following description, like parts are designated by like reference numbers throughout the several drawings.

DESCRIPTION OF THE PREFERRED EMBODIMENT

An embodiment of the invention will be described below.

Figure 1:
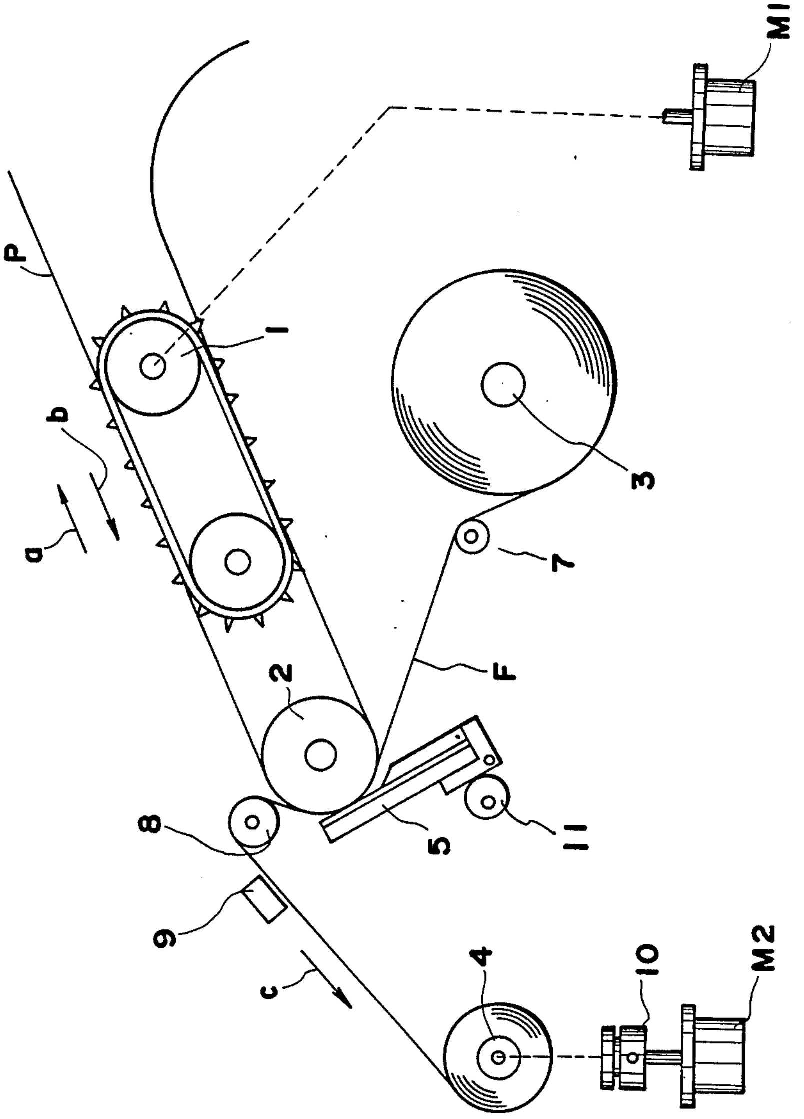
FIG. 1 is a diagram showing a thermal transfer color printer embodying the invention.

FIG. 1 is a diagram schematically showing the construction of a thermal transfer color printer embodying the invention.

The printer includes a tractor feeder 1 and a platen roller 2 around which elongated transfer paper P extends. At the position where the transfer paper P is in contact with the platen roller 2, the paper P comes into contact with an ink film F extending from a feed roll 3 to a takeup roll 4. At the position where the paper P and the film F are in contact with each other, inks on the ink film F are transferred onto the paper P by a thermal head 5 disposed on the rear side of the film F, whereby images are recorded on the paper P. The diagram further shows a guide roller 7 for stabilizing the tension on the ink film F, and a separating roller 8 for moving the ink film F out of intimate contact with the transfer paper P after recording. Disposed in the vicinity of the separating roller 8 is a sensor 9 for detecting marks SY, SM and SC (FIG. 2) indicating the colors of the ink film F.

The tractor feeder 1, which is coupled to a stepping motor M1, operates to transport the paper P in two directions, i.e., forward (direction of arrow a) and reversely (direction of arrow b). The amount and direction of transport of the transfer paper P are controlled by changing the number and polarity of pulses to be given to the stepping motor M1.

The takeup roll 4 is coupled to a stepping motor M2 through a one-way clutch 10 for transporting the ink film F only in the direction of arrow c. The amount of transport of the ink film F is controlled by varying the number of pulses to be given to the stepping motor M2. The one-way clutch 10 transmits a drive force from the motor M2 to the takeup roll 4 for transporting the ink film F in the direction of arrow c but does not transmit any reverse torque. A slip clutch or the like is used as the one-way clutch 10 so that an excessive torque, even if acting in the film transport direction c, will not break the ink film F. The one-way clutch 10 gives constant tension to the ink film F at all times, thus permitting the takeup roll 4 to wind up the film reliably.

Figure 3:
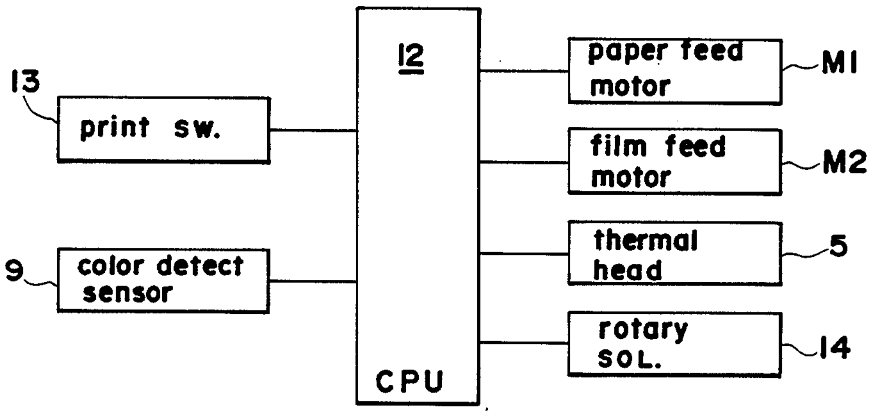
FIG. 3 is a block diagram showing a control circuit included in the embodiment.

The thermal head 5 is pivotally movable between a position where the head 5 presses the transfer paper P and the ink film F against the platen roller 2 and a position away from the platen roller 2. An eccentric cam 11 in contact with a portion of the thermal head 5 is provided for pressing the thermal head 5 against the platen roller 2 or moving the head away from the roller 2. The eccentric cam 11 is driven by a rotary solenoid 14 (FIG. 3). When the thermal head 5 is pressed against the platen roller 2, a multiplicity of heating elements mounted on the thermal head 5 and arranged in a direction parallel to the axis of the platen roller 2 are selectively driven, whereby the ink is transferred from the ink film F to the transfer paper P.

Figure 2:
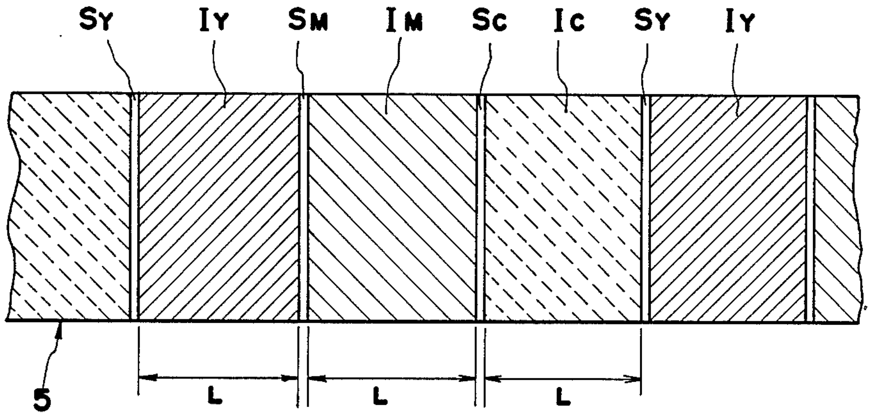
FIG. 2 is a diagram illustrating the form of an ink film for use in the printer.

With reference to FIG. 2, the ink film F is in the form of a strip having approximately the same width as the transfer paper P and is provided thereon with ink layers IY, IM and IC of three colors, i.e., yellow, magenta and cyan, having a specified length L. The ink film F has the color indicating marks SY, SM and SC preceding the respective ink layers IY, IM and IC with respect to the direction of transport of the film. The marks SY, SM and SC indicate the colors of the respective following ink layers and are detectable by the color sensor 9.

FIG. 3 is a block diagram showing the control circuit of the thermal transfer color printer. The printer is controlled in its entirety by a CPU 12 which has connected thereto a print switch 13, the color sensor 9, the motors M1 and M2, the thermal head 5, and the rotary solenoid 14 for pivotally moving the thermal head 5.

Figure 4A:
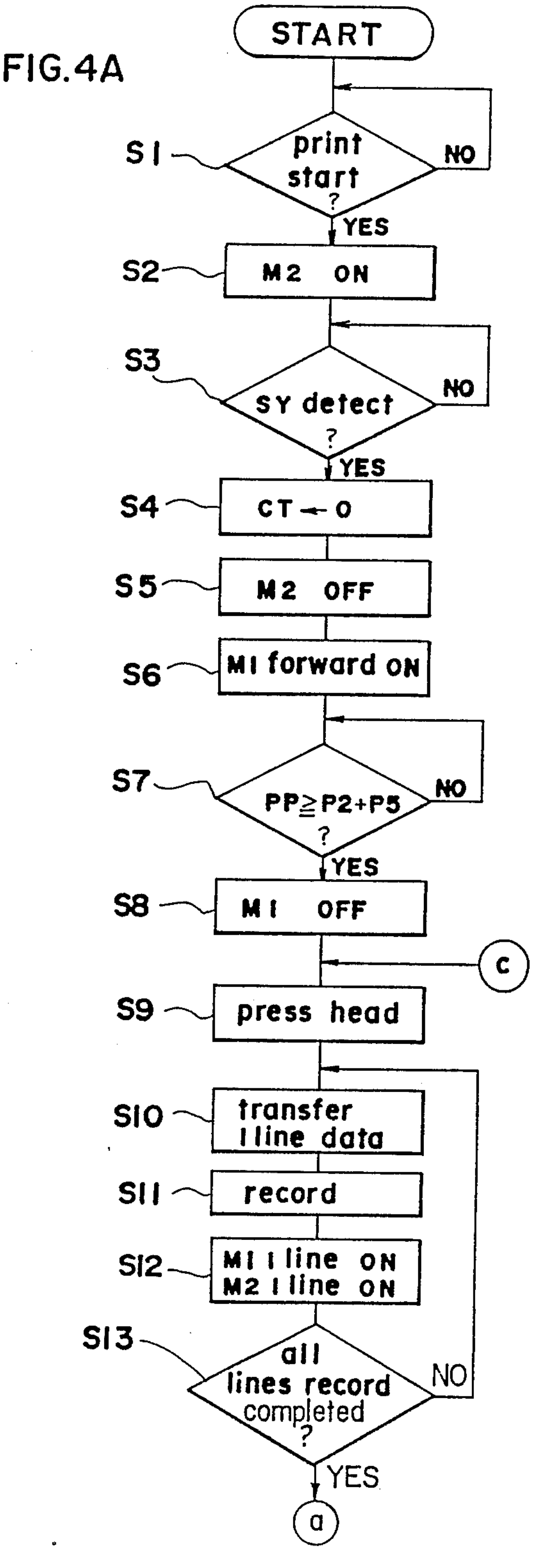
FIGS. 4A to 4C and FIG. 5 are, respectively, flow charts and a time chart showing the recording operation of the embodiment.
Figure 4B:
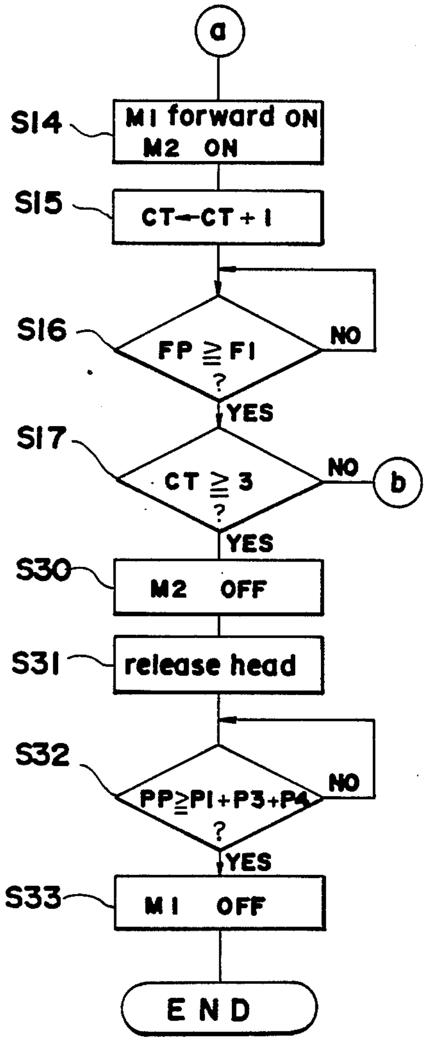
Figure 4C:
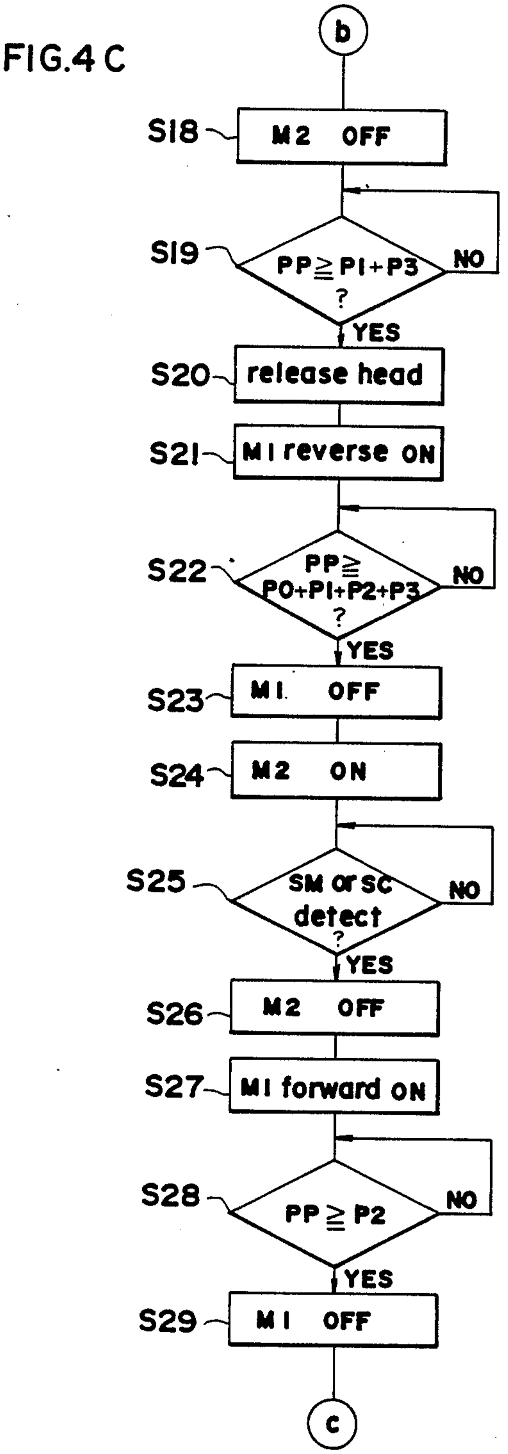
Figure 5:
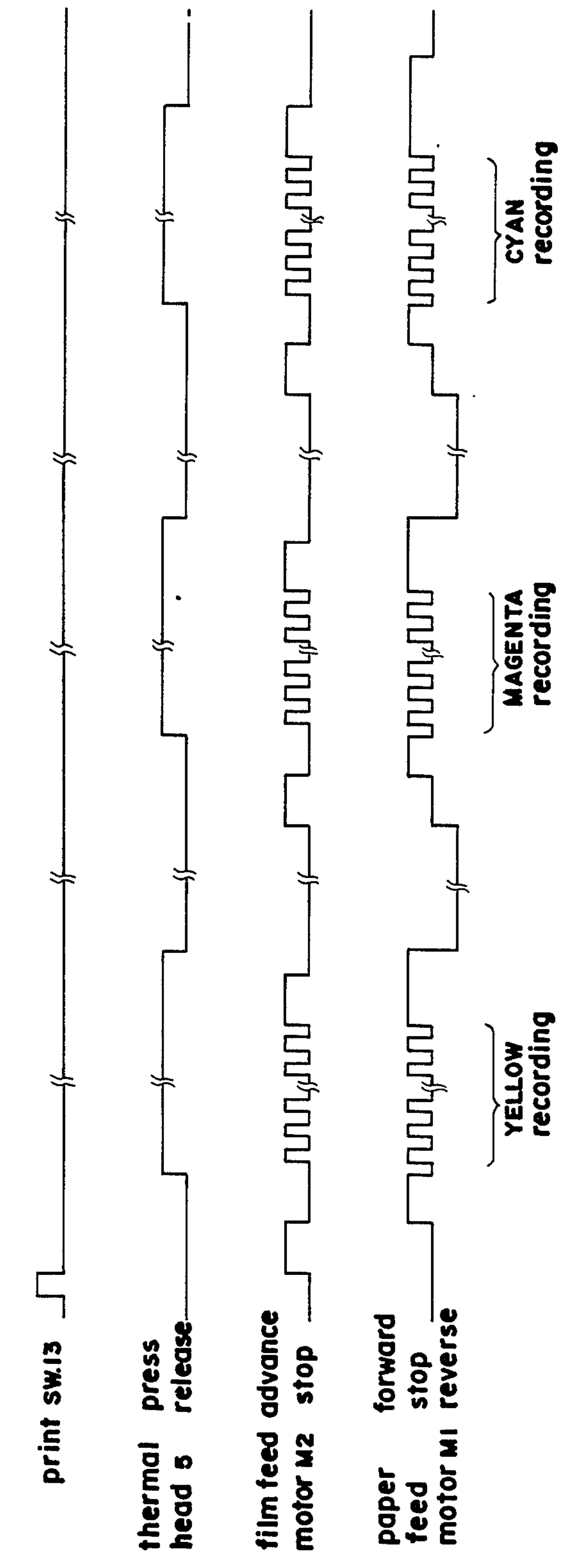

The recording operation of the color printer will be described below with reference to the flow charts of FIGS. 4A to 4C and the time chart of FIG. 5.

Figure 6:
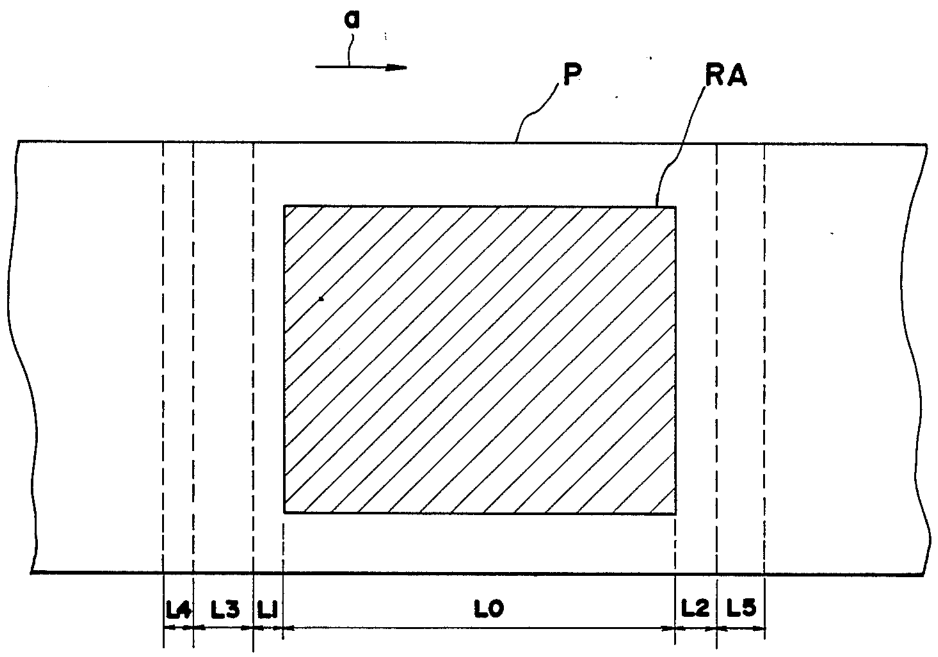
FIG. 6 is a diagram for illustrating the lengths of portions of transfer paper.

When depression of the print switch 13 is detected (step S1), the stepping motor M2 is energized to start transporting the ink film F (step S2). In this state, the thermal head 5 is away from the platen roller 2. Upon the color sensor 9 detecting the yellow mark SY, a counter CT is reset to "0" (step S4), and the motor M2 is deenergized to discontinue transport of the ink film. The counter CT is advanced every time an image is recorded in each of the colors, yellow, magenta and cyan. At this time, the leading end of a recording area RA of the transfer paper P where the image is to be recorded is positioned at a distance of L2+L5 away from the thermal head 5 upstream thereof with respect to the direction of advance of the paper P as seen in FIG. 6. To position the leading end of the recording area RA in opposed relation with the thermal head 5, the stepping motor M1 is therefore energized to start advancing the paper P (step S6). Subsequently, the number of pulses PP given to the stepping motor M1 becomes equal to the sum of pulse numbers P2 and P5 for transporting the paper P by a distance L2 and distance L5, respectively (step S7), whereupon the motor M1 is deenergized to discontinue the transport of the paper P.

In this way, the yellow ink layer IY of the ink film F and the recording area RA of the paper P are both positioned opposed to the thermal head 5, whereupon the thermal head 5 is pressed against the platen roller 2 (step S9). Recording data for one line is transferred to the thermal head 5 step S10) to drive heating elements individually according to the recording data and thereby record an image portion for one line (step S11). A predetermined number of pulses are then fed to each of the stepping motors M1 and M2 to advance both the paper P and the ink film F in synchronism by one line (step S12). The one-line recording operation of steps S10 to S12 is repeatedly conducted until the contemplated image is completely recorded in the recording area RA for every line.

Figure 7:
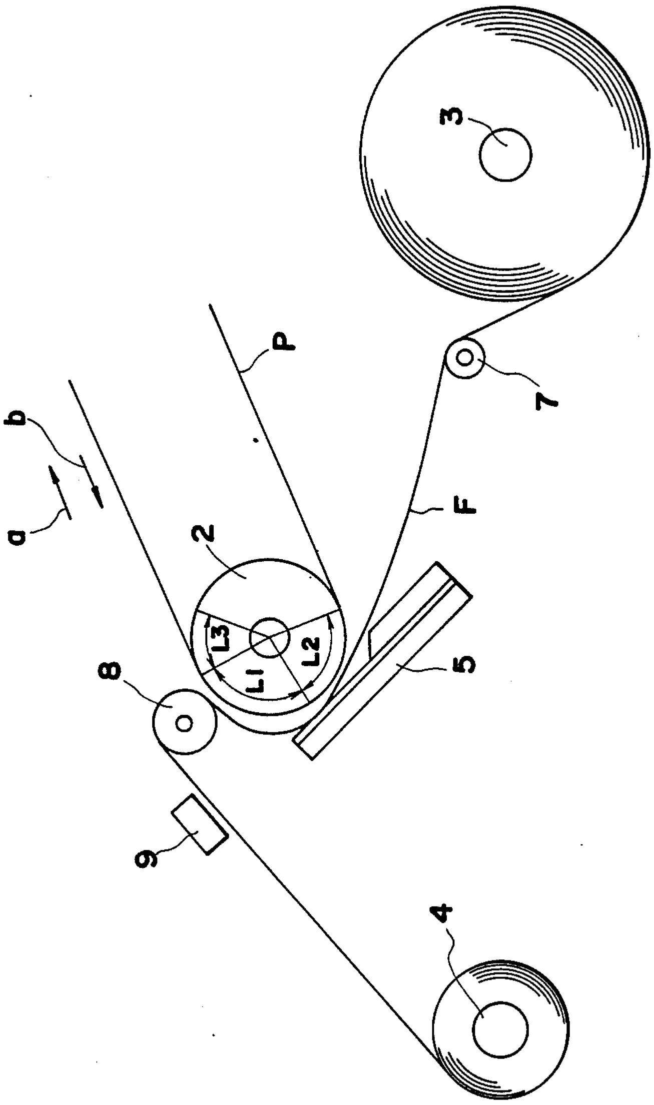
FIG. 7 is a diagram for illustrating the lengths of some of the portions along the periphery of a platen roller.

When the recording in the yellow ink has been completed in all lines of the recording area RA (step S13), both the stepping motors Ml, M2 are energized to advance the paper P and the film F in intimate contact therewith in synchronism (step S14), and the counter CT is advanced by an increment of 1 (step S15). The number of pulses PP given to the stepping motor M2 then reaches a pulse number F1 for transporting the film F by a distance L1 from the position opposed to the thermal head 5 to a position where the film is separated from the paper P by the separating roller 8 (step S16), whereupon the counter CT is checked as to whether the count is smaller than "3". If the count is smaller than "3", indicating that recording in all the three colors has not been completed, the stepping motor M2 is deenergized (step S18), with the stepping motor M1 held energized, advancing the paper P. Consequently, with the thermal head 5 pressed against the platen roller 2, the ink film F in intimate contact with the transfer paper P is transported not by the torque of the stepping motor M2 but only by the movement of the paper P. The number of pulses PP given to the stepping motor M1 in step S14 and the following steps then reaches a pulse number (P1+P3) required for transporting the paper P by the distance L1 plus a specified distance L3 (step S19), whereupon the thermal head 5 is released from the platen roller 2 (step S20). The ink film F has been moved forwardly by contact with the paper P with the stepping motor M2 held unenergized and therefore slackens in the vicinity of the separating roller 8 without being wound up on the takeup roll 4 (see FIG. 7).

After the ink film F has been thus slackened, the stepping motor M1 is brought into reverse rotation to start transporting the paper P reversely in the direction of arrow b (step S21). During the reverse transport, the number of pulses PP given to the stepping motor M1 reaches a pulse number $(P0+P1+P2+P3)$ needed for a nonrecording area of the paper P, which is away from the leading end of the recording area RA by the distance L2 upstream thereof, to retract to the position opposed to the thermal head 5 (step S22), whereupon the stepping motor M1 is deenergized (step S23). The pulses, P0 in number, are those given to the stepping motor M1 for transporting the paper P by a distance corresponding to the length L0 of the recording area RA along the direction of transport.

After the nonrecording area of the transfer paper P has been thus brought to the position where it is opposed to the thermal head 5, i.e., the position where the area comes into contact with the ink film F, the stepping motor M2 is energized to start transporting the ink film F (step S24) for recording an image in the magenta ink. Upon the color sensor 9 detecting the magenta mark SM (step S25), the stepping motor M2 is deenergized to discontinue the transport of the film F (step S26). Subsequently, to position the leading end of the recording area RA of the paper P in opposed relation with the thermal head 5, the stepping motor M1 is energized (step S27). The number of pulses PP given to the motor then reaches the pulse number P2 required for transporting the paper P by the distance L2 (step S28), whereupon the motor M1 is deenergized (step S29).

In this way, the leading end of the recording area RA already bearing the yellow record is registered with the leading end of the magental ink layer IM at the position opposed to the thermal head 5, and the same procedure as the foregoing steps S9 to S29 is executed to produce a magenta record. After the completion of recording in magenta, the same steps as steps S9 to S16 are repeated to produce a cyan record. Consequently, a color image is formed in the recording area with the three color inks.

When the recording in cyan is completed, the count of the counter CT is "3". This is confirmed in step S17, which is then followed by step S30 to turn off the stepping motor M2 which is energized after the completion of cyan recording. The thermal head 5 is released from the platen roller 2 in step S31. The number of pulses PP given to the stepping motor M1 after the cyan recording then reaches a pulse number $(P1+P3+P4)$ for discharging the transfer paper P from the printer (step S32), whereupon the motor M1 is deenergized (step S33). The pulse number P4 is set to a desired value for transporting the paper P excessively by a distance L4 to discharge the paper from the printer after recording in all colors has been completed.

With the thermal transfer color printer embodying the invention and described above, the transfer paper P only is advanced with the stepping motor M2 for transporting the ink film F held deenergized after the completion of recording in yellow as well as in magenta to thereby slacken the ink film F, whereupon the paper P is transported in the reverse direction. Accordingly, the paper P can be transported reversely with reduced frictional resistance between the paper P and the ink film F since the film F is not tensioned.

Further with the present embodiment, the ink film F is transported while opposed to the nonrecording area of the transfer paper P for the color sensor 9 to detect the marks SY, SM and SC provided for the respective ink layers on the film F, with the result that the ink already transferred onto the paper P is precluded from coming into contact with the ink on the film F. Investigation of the frictional resistance between the transfer paper and the ink film we made has revealed that when the ink on the ink film is brought into contact with the ink transferred to the paper, the frictional resistance acting between the two ink portions is exceedingly great, whereas when the ink film is transported while opposed to the nonrecording area of the transfer paper as in the present embodiment, the frictional resistance can be substantially diminished.

With the frictional resistance between the paper and the ink film thus diminished, both the paper and the film can be transported with good stability to afford satisfactory color images.

Although the transfer paper used in the foregoing embodiment is a strip of paper in the form of a roll, cut sheets of paper are also usable. In this case, however, there arises a need to provide in place of the tractor feeder a pair of paper transport rollers at each of the upstream side and downstream side of the platen roller with respect to the direction of transport of the sheet for handling the paper sheet, and to control the amount and direction of rotation of the rollers. It is also necessary to provide guide plates defining the path of transport of the paper sheet.

Furthermore, d.c. motors are usable in place of the stepping motors employed in the above embodiment as drive means for transporting the transfer paper and the ink film. However, since the rotation of the d.c. motor is not controllable by varying the number of pulses, there is a need to use an encoder, timer or the like for controlling the amount of rotation of the motor.

Although the ink film used for the above embodiment has yellow, magenta and cyan ink layers, a black ink layer may be formed on the film in addition to these ink layers, or an entirely different combination of colors may be used. These ink layers of different colors can be arranged in an optional order.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A thermal transfer color recording method of recording a color image on a transfer paper by successively transferring inks of different colors from an ink film to the transfer paper at a recording station, the method comprising:

- a first step of transferring an ink of one color from the ink film to the transfer paper based on an image to be recorded, while transporting the ink film and the transfer paper through the recording station in a forward direction in intimate contact with each other and taking up the ink film past the recording station;
- a second step of transporting the transfer paper in intimate contact with the ink film in the forward direction with the ink film not taken up to thereby slacken the ink film;
- a third step of transporting the transfer paper in the reverse direction to position the leading end of a recorded area of the transfer paper at the recording station;
- a fourth step of transporting the ink film in the forward direction to position an ink of another color at the recording station; and
- a fifth step of transferring an ink of another color from the ink film to the transfer paper from the leading end of the recorded area thereof based on the image to be recorded, while transporting the ink film and the transfer paper through the recording station in the forward direction in intimate contact with each other and taking up the ink film past the recording station.

2. A thermal transfer color recording method of recording a color image on a transfer paper by successively transferring inks of different colors from an ink film to the transfer paper at a recording station, the method comprising:

- a first step of transferring an ink of one color from the ink film to the transfer paper based on an image to be recorded, while transporting the ink film and the transfer paper through the recording station in a forward direction in intimate contact with each other and taking up the ink film past the recording station;

a second step of transporting the transfer paper in the reverse direction to position a non-recorded area of the transfer paper at the recording station;

a third step of transporting the ink film in the forward direction to position an ink of another color at the recording station;

a fourth step of transporting the transfer paper in the forward direction to position the leading end of a recorded area of the transfer paper at the recording station; and a fifth step of transferring an ink of another color from the ink film to the transfer paper from the leading end of the recorded area thereof based on the image to be recorded, while transporting the ink film and the transfer paper through the recording station in the forward direction in intimate contact with each other and taking up the ink film past the recording station.

3. A thermal transfer color recording method of recording a color image on a transfer paper by successively transferring inks of different colors from an ink film to the transfer paper at a recording station, the method comprising:

a first step of transferring an ink of one color from the ink film to the transfer paper based on an image to be recorded, while transporting the ink film and the transfer paper through the recording station in a forward direction in intimate contact with each other and taking up the ink film past the recording station;

a second step of transporting the transfer paper in intimate contact with the ink film in the forward direction with the ink film not taken up to thereby slacken the ink film;

a third step of transporting the transfer paper in the reverse direction to position a non-recorded area of the transfer paper at the recording station;

a fourth step of transporting the ink film in the forward direction to position an ink of another color at the recording station;

a fifth step of transporting the transfer paper in the forward direction to position the leading end of a recorded area of the transfer paper at the recording station; and a sixth step of transferring the ink of another color from the ink film to the transfer paper from the leading end of the recorded area thereof based on the image to be recorded, while transporting the ink film and the transfer paper through the recording station in the forward direction in intimate contact with each other and taking up the ink film past the recording station.

4. A thermal transfer color recording apparatus for recording a color image on a transfer paper by successively transferring inks of different colors from an ink film to the transfer paper at a recording station, the apparatus comprising:

ink film supply means for supplying the ink film past the recording station;

ink film take-up means for taking up the ink film supplied by said supply means;

a platen located at the recording station;

a thermal head located adjacent said platen;

paper transport means for transporting the transfer paper in forward and reverse directions through the recording station between said thermal head and said platen; and control means for controlling said ink film take-up means and paper transport means, after completion of recording with an ink of one color, so as to move the transfer paper in intimate contact with the ink film in the forward direction with the ink film take-up means turned off to thereby slacken the ink film, and thereafter to move the transfer paper in the reverse direction to position the leading end of a recorded area of the transfer paper at the recording station.

5. A thermal transfer color recording apparatus as claimed in claim 4, further comprising means for moving said thermal head between a first position for pressing the transfer paper and the ink film against said platen and a second position away from the platen.

6. A thermal transfer color recording apparatus as claimed in claim 5, wherein said thermal head moving means positions the thermal head at the first position during the transport of the transfer paper in the forward direction under control of said control means and during recording, and positions the thermal head at the second position during the transport of the transfer paper in the reverse direction under control of said control means.

7. A thermal transfer color recording apparatus for recording a color image on a transfer paper by successively transferring inks of different colors from an ink film to the transfer paper at a recording station, the apparatus comprising:

ink film supply means for supplying the ink film past the recording station;

ink film take-up means for taking up the ink film supplied by said supply means;

a platen located at the recording station;

a thermal head located adjacent said platen;

paper transport means for transporting the transfer paper in forward and reverse directions through the recording station between said thermal head and said platen; and control means for controlling said ink film take-up means and paper transport means, after completion of recording with an ink of one color, so as to move the transfer paper in the reverse direction to position a non-recorded area of the transfer paper at the recording station, thereafter to move the ink film to position an ink of another color at the recording station, and subsequently to move the transfer paper in the forward direction to position the leading end of a recorded area of the transfer paper at the recording station.

8. A thermal transfer color recording apparatus as claimed in claim 7, further comprising means for moving said thermal head between a first position for pressing the transfer paper and the ink film against said platen and a second position away from the platen.

9. A thermal transfer color recording apparatus as claimed in claim 8, wherein said thermal head moving means positions the thermal head at the first position during recording, and positions the thermal head at the second position during the transport of the transfer paper in the reverse direction and during the transport of the ink film under control of said control means.

10. A thermal transfer color recording apparatus for recording a color image on a transfer paper by successively transferring inks of different colors from an ink film to the transfer paper at a recording station, the apparatus comprising:

ink film supply means for supplying the ink film past the recording station;

ink film take-up means for taking up the ink film supplied by said supply means;

a platen located at the recording station;

a thermal head located adjacent said platen;

paper transport means for transporting the transfer paper in forward and reverse directions through the recording station between said thermal head and said platen; and control means for controlling said ink film take-up means and paper transport means, after completion of recording with an ink of one color, so as to move the transfer paper in intimate contact with the ink film in the forward direction with the ink film take-up means turned off to thereby slacken the ink film, thereafter to move the transfer paper in the reverse direction to position a non-recorded area of the transfer paper at the recording station, subsequently to move the ink film to position an ink of another color at the recording station, and then to move the transfer paper in the forward direction to position the leading end of a recorded area of the transfer paper at the recording station.

11. A thermal transfer color recording apparatus as claimed in claim 10, further comprising means for moving said thermal head between a first position for pressing the transfer paper and the ink film against said platen and a second position away from the platen.

12. A thermal transfer color recording apparatus as claimed in claim 11, wherein said thermal head moving means positions the thermal head at the first position during the transport of the transfer paper in the forward direction to slacken the ink film under control of said control means and during recording, and positions the thermal head at the second position during the transport of the transfer paper in the reverse direction, during the transport of the ink film and during the transport of the transfer paper in the forward direction to position the leading end of the recorded area of the transfer paper at the recording station under control of said control means.

* * * * *